(12) United States Patent
Chen

(10) Patent No.: US 8,910,147 B2
(45) Date of Patent: Dec. 9, 2014

(54) APPLICATION INSTALLATION METHOD AND MOBILE DEVICE

(71) Applicant: Chi-Lung Chen, Taipei (TW)

(72) Inventor: Chi-Lung Chen, Taipei (TW)

(73) Assignee: ASUSTeK Computer Inc., Taipei (TW)

(*) Notice: Subject to any disclaimer, the term of this patent is extended or adjusted under 35 U.S.C. 154(b) by 85 days.

(21) Appl. No.: 13/851,968

(22) Filed: Mar. 28, 2013

(65) Prior Publication Data

US 2013/0275959 A1 Oct. 17, 2013

Related U.S. Application Data

(60) Provisional application No. 61/625,099, filed on Apr. 17, 2012.

(30) Foreign Application Priority Data

Mar. 4, 2013 (TW) .............................. 102107546 U

(51) Int. Cl.
G06F 9/445 (2006.01)

(52) U.S. Cl.
CPC ... *G06F 8/61* (2013.01); *G06F 8/60* (2013.01)
USPC .......................................... 717/174; 717/176

(58) Field of Classification Search
CPC ...................................... G06F 8/60; G06F 8/61
USPC ................................................... 717/174, 176
See application file for complete search history.

(56) References Cited

U.S. PATENT DOCUMENTS

| 7,739,608 | B2 * | 6/2010 | Fujishita ....................... 715/744 |
| 8,346,223 | B1 * | 1/2013 | Byrnes et al. ............... 455/414.1 |
| 8,639,733 | B2 * | 1/2014 | Holden et al. ................ 707/827 |
| 8,655,341 | B2 * | 2/2014 | Boukai et al. ................ 455/419 |
| 2008/0059782 | A1 | 3/2008 | Kruse et al. |
| 2010/0277467 | A1 * | 11/2010 | Kurihara ....................... 345/418 |
| 2013/0151672 | A1 * | 6/2013 | Lee et al. ..................... 709/219 |

FOREIGN PATENT DOCUMENTS

| CN | 1641513 | 7/2005 |
| TW | 201104575 | 2/2011 |

* cited by examiner

*Primary Examiner* — Phillip H Nguyen
(74) *Attorney, Agent, or Firm* — Jianq Chyun IP Office

(57) ABSTRACT

An application installation method for a mobile device is provided. In the method, the application is analyzed to obtain a supporting display format. When the supporting display format of the application meets a first display format of the mobile device, the application is installed. When the supporting display format of the application only supports a second display format of an electronic device, a notification is issued to warn that the application only supports the second display format. When a continuously installing signal is received, the application is installed. When a termination signal is received, the installation of the application is terminated.

12 Claims, 4 Drawing Sheets

APPLICATION INSTALLATION METHOD AND MOBILE DEVICE

CROSS-REFERENCE TO RELATED APPLICATION

This application claims the priority benefits of U.S. provisional application Ser. No. 61/625,099, filed on Apr. 17, 2012 and Taiwan application serial no. 102107546, filed on Mar. 4, 2013. The entirety of each of the above-mentioned patent applications is hereby incorporated by reference herein and made a part of this specification.

BACKGROUND OF THE INVENTION

1. Field of Invention

The present disclosure relates to an application installation method and a mobile device. More particularly, the present disclosure relates to a method for a hybrid portable device to install an application therein.

2. Description of Related Art

With the development of technologies, portable devices, such as cell phones, smart phones, personal digital assistant (PDA) phones, tablet personal computers (tablet PCs), and notebook computers, have been broadly used in our daily life. Operating systems on these portable devices, such as Apple iOS and Google Android, allow users to install third-party applications. Namely, a user can directly download third-party applications onto a portable device through the Internet.

The fields of aforementioned application are various include business, travel, personal management, project management, etc. Some applications are designed for particular display format. For instance, some applications only support the display formats of the tablet PCs and cannot support the display formats of the smart phones or some applications only support the display formats of the smart phones but cannot support the display format of the tablet PCs. Hence, when the application which is designed for a particular display format is installed in the portable device of which the display device is not supported by the application, usually, the application cannot be executed normally or the application may be abnormally terminated.

SUMMARY OF THE INVENTION

Accordingly, the present disclosure provides an application installation method and a mobile device which are capable of marking the hardware supporting abilities of the application while the application is installed and sorting the object corresponding to the application into the application list corresponding to the hardware supporting abilities of the application. Therefore, when selecting the object to launch the corresponding application, the user can easily realize whether the launched application supports the mobile device in use. Further, it avoids the mobile device from launching the application which does not support the mobile device and the problems of failure operation or automatically shutdown of the mobile device due to launching the application can be overcome.

The disclosure provides an application installation method for a mobile device to install an application. In the method, the application is analyzed to obtain a supporting display format of the application. When the supporting display format of the application meets a first display format of the mobile device, the application is installed. When the supporting display format of the application only support a second display format of an electronic device, a notification is issued to warn the application only supports the second display format, the application is installed as a continuously installing signal is received, and an installation of the application is terminated when a termination signal is received.

A mobile device comprises a storage unit and a processor. The storage unit stores an application. The processor analyzes the application to obtain a supporting display format of the application and installs the application when the supporting display format of the application meets a first display format of the mobile device, and, when the supporting display format of the application only support a second display format of an electronic device, the processor issues a notification to warn the application only supports the second display format, installs the application when a continuously installing signal is received and terminates an installation of the application when a termination signal is received.

Accordingly, in the application installation method and mobile device of the present case, before the application is installed, the application is analyzed to obtain it's hardware supporting abilities. When the hardware supporting abilities shows that the application does not support the display format of the display device of the mobile device, the user is notified to determine whether the installation of the application continues or should be terminated. Moreover, at the time the application is installed, the hardware supporting abilities of the application are recorded/labeled and the object corresponding to the installed application is classified into the application list corresponding to the hardware supporting abilities of the installed application. Hence, once the user selects the object to launch the corresponding application, the user clearly realizes whether the launched application supports the mobile device in use, which avoid the mobile device from launching the application which does not support the mobile device in use and the problems of failure operation or automatically shutdown of the mobile device due to launching the application can be overcome.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE PREFERRED EMBODIMENTS

Figure 1:
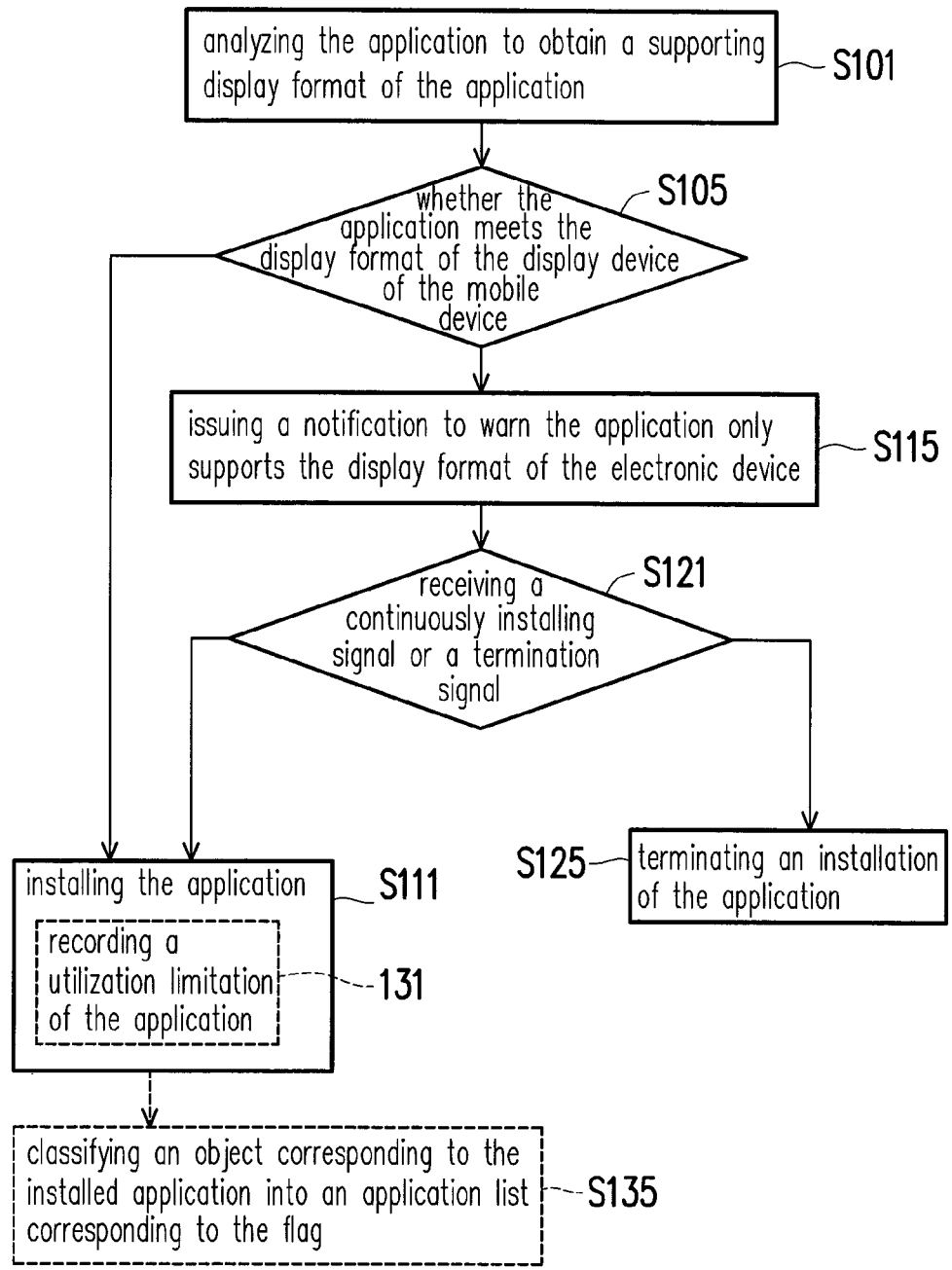
FIG. 1 is a process flow diagram, schematically illustrating an application installation method according to one preferred embodiment of the disclosure.
Figure 2:
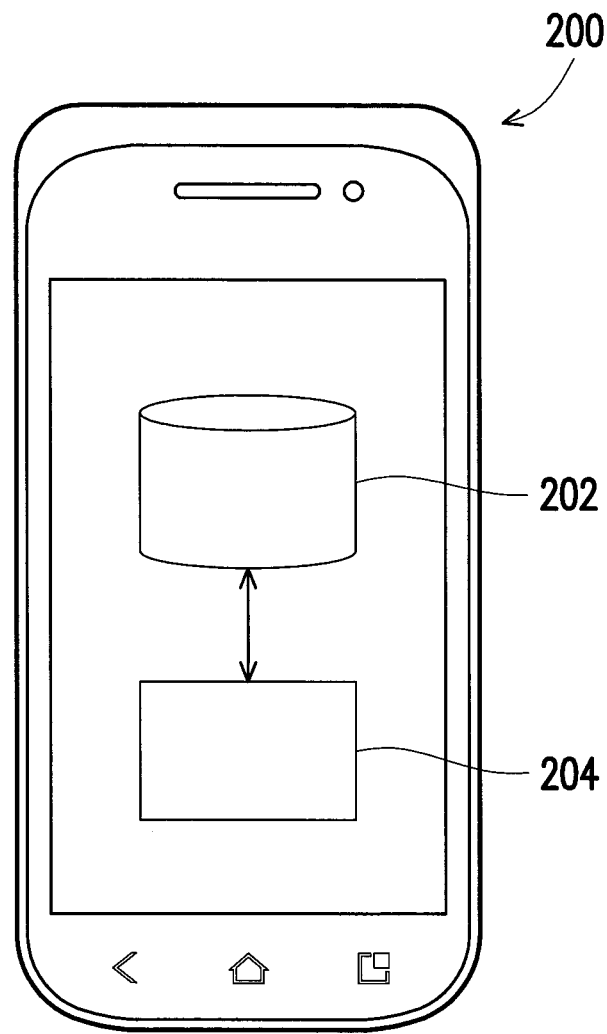
FIG. 2 is a schematic diagram showing a mobile device according to one embodiment of the disclosure.

FIG. 1 is a process flow diagram, schematically illustrating an application installation method according to one preferred embodiment of the disclosure. FIG. 2 is a schematic diagram showing a mobile device according to one embodiment of the disclosure. As shown in FIG. 1 and FIG. 2, the mobile device 200 of the present embodiment comprises a storage unit 202 and a processor 204. The mobile device 200 can be, for example, a cell phone, a smart phone or a personal digital assistant. The processor 204 can be, for example, a microcontroller, an embedded controller or a central processing unit (CPU). Moreover, the mobile device 200 can be, for example, coupled to/combined with an electronic device to form a hybrid portable device, such as a tablet personal computer (tablet PC) or a notebook computer. The electronic device has a display device and can receive the control signal sent from the mobile device so as to display frames on its display device after the electronic device is coupled to the mobile device 200. It should be noticed that the first display format of the mobile device 200 is different from the second display format of the electronic device (i.e. the display format of the display device of the electronic device). More clearly, the size of the display device of the electronic device is larger than that of the display device of the mobile device 200 and the resolution of the display device of the electronic device is higher than that of the display device of the mobile device 200.

Figure 4A:
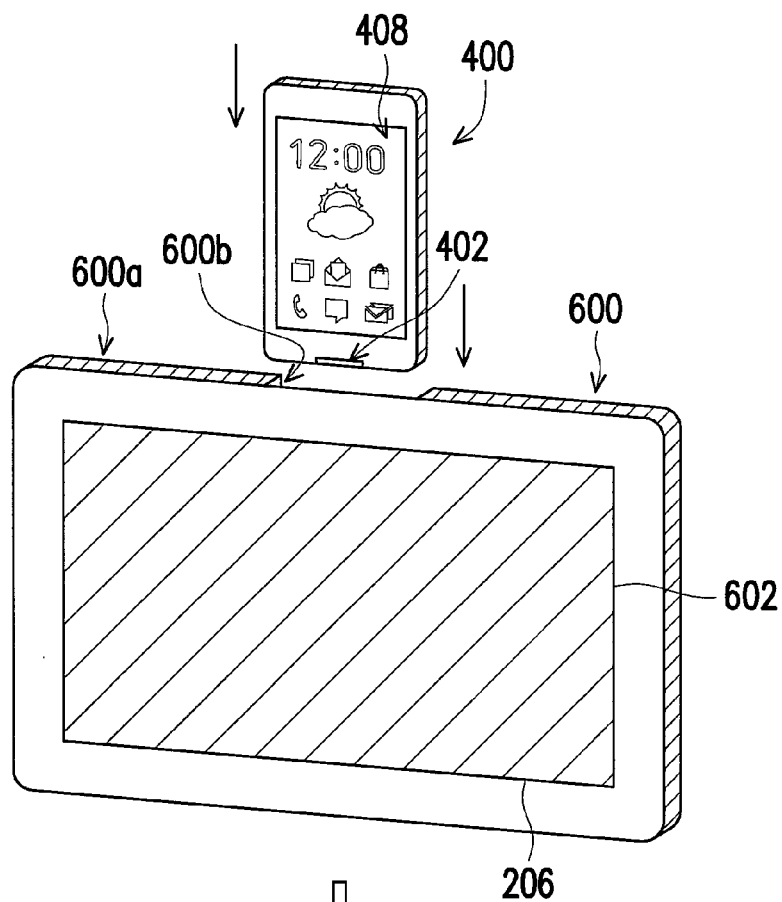
FIGS. 4A through 4B are schematic diagrams of a hybrid portable device before and after assembly according to one embodiment of the disclosure.
Figure 4B:
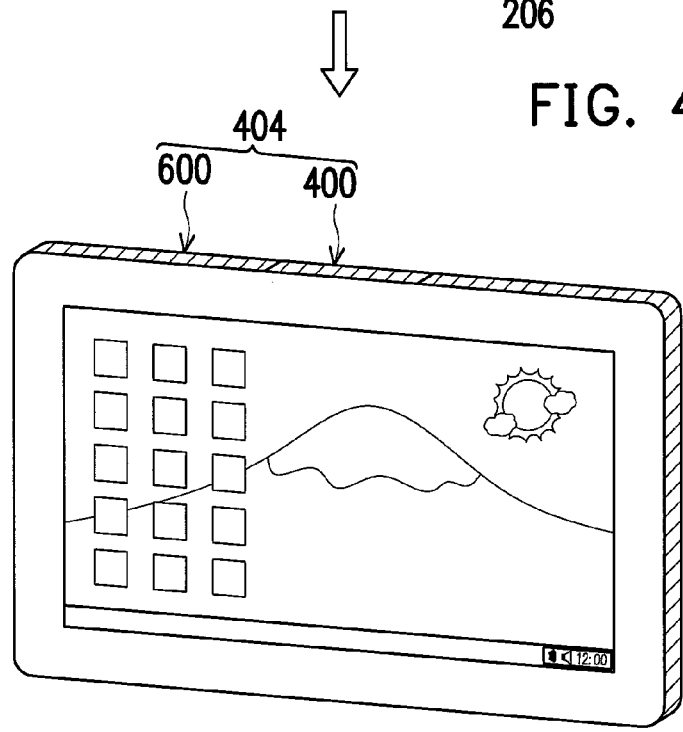

More specifically, the mobile device 200 can be coupled to the electronic device to form a hybrid portable device. FIGS. 4A through 4B are schematic diagrams of a hybrid portable device before and after assembly according to one embodiment of the disclosure. As shown in FIG. 4A and FIG. 4B, the mobile device 400 is coupled to an electronic device 600 through a connection port 402 so that the mobile device 400 and the electronic device 600 together form a hybrid portable device 404. For instance, in the present embodiment, the mobile device 400 can be a smart phone or a personal digital assistant and has a display device 408 with resolution of about 480×320 or 960×640. Further, the electronic device 600 has a display device 602 with resolution of about 1024×768, 2048× 1536 or 2560×1600. The mobile device 400 moves along the slide 600b at the back surface 600a of the electronic device 600 opposite to the front surface on which the display device 602 is mounted so as to insert the slot (not shown) at the back surface 600a and to be couple with the electronic device 600 through the connection port 402 to form a hybrid portable device 404 (as shown in FIG. 4B). The hybrid portable device 204 can be, for example, a tablet personal computer or a notebook computer.

As shown in FIG. 1 and FIG. 2, in the step S101 which is after an application is downloaded and is stored in the storage unit 202, the processor 204 analyzes the application to obtain the supporting display format of the application. That is, the mobile device 200 of the present embodiment allows the user to download various applications with different types and when the installation procedure of the application is initiated, the processor 204 analyzes the application in advance to recognize the display format which is supported by the application. Then, in the step S105, the processor 204, according to the supporting display format of the application, determines whether the application meets the display format of the display device of the mobile device 200. The aforementioned supporting display format includes the display information (such as resolution of the display device, display dimensions, display color depth, etc.) indicating that which format or system of mobile device is supported by the application.

For instance, as for the tablet PC-specific application, the supporting display format records that the resolutions which the application supported include 1024×768, 2048×1536 or 2560×1600 or records that the display dimensions which the application supported include 7", 10.1" or 11.6". Further, as for the application which meets both of the tablet PC and mobile cell, the supporting display format records that the resolutions which the application supports include 480×320, 960×640 and 1024×768 or records that the display dimensions which the application supports include 3.5~3.8", 4.5~4.9", 7", 10.1" or 11.6". Since the application can be the tablet PC-specific application only supporting the table PC or a common application supporting both of the tablet PC and mobile cell, the supporting display format of the application is analyzed before the application is installed and, in the following steps, it is determined whether the application is continuously installed according to the supporting display format of the application.

In the step S111, when the supporting display format of the application meets the display format of the display device of the mobile device 200, the processor 204 starts to install the application.

However, in the step S115, when the supporting display format of the application does not support the display format of the display device of the mobile device 200 (e.g. the application only supports large dimension display or the display with high resolution), the processor 204 issues a notification to warn that the application does not support the display format of the display device of the mobile device 200. Thereafter, in the step S121, it is determined whether any signal (including the continuously installing signal or a termination signal) is received. When receiving the continuously installing signal, the processor 204 installs the application (step S111). Alternatively, in the step S125, when receiving the termination signal, the processor 204 terminates the installation of the application.

In one embodiment, when the continuously installing signal is received, the step S111 of installing the application further comprises that the processor 204 records a utilization limitation of the application (step S131), and the utilization limitation includes that the application only supports a portion of the display formats (e.g. it records that the application does not support the display format of the display device of the mobile device 200 or the application only supports large dimension display or the display with high resolution). In another embodiment, the processor 204 recording the utilization limitation (step S131) further comprises giving the application a flag corresponding to the supporting display format by the application (e.g. the application only supports the large dimension display or the display with high resolution). More clearly, the application can be set to be corresponding to the flag according to the type of the device supported by the application.

For instance, the supporting display format of the application records that the resolution the application supports is 1024×768, which means the application only supports the device (such as the tablet PC) having the display device with the resolution of about 1024×768. Hence, the flag of the application is set to be a first value "P" (which will be simplified as the first value P in the following description). In other words, in the present embodiment, if the content recorded in the supporting display format of the application meets that the application only supports the tablet PC, the flag of the application is set to be the first value P. Moreover, the present embodiment does not limit the expression of the flag. That is, the flag can be numbers, word strings, symbols or symbols which are capable of distinguish the supporting display format from one another.

Figure 3:
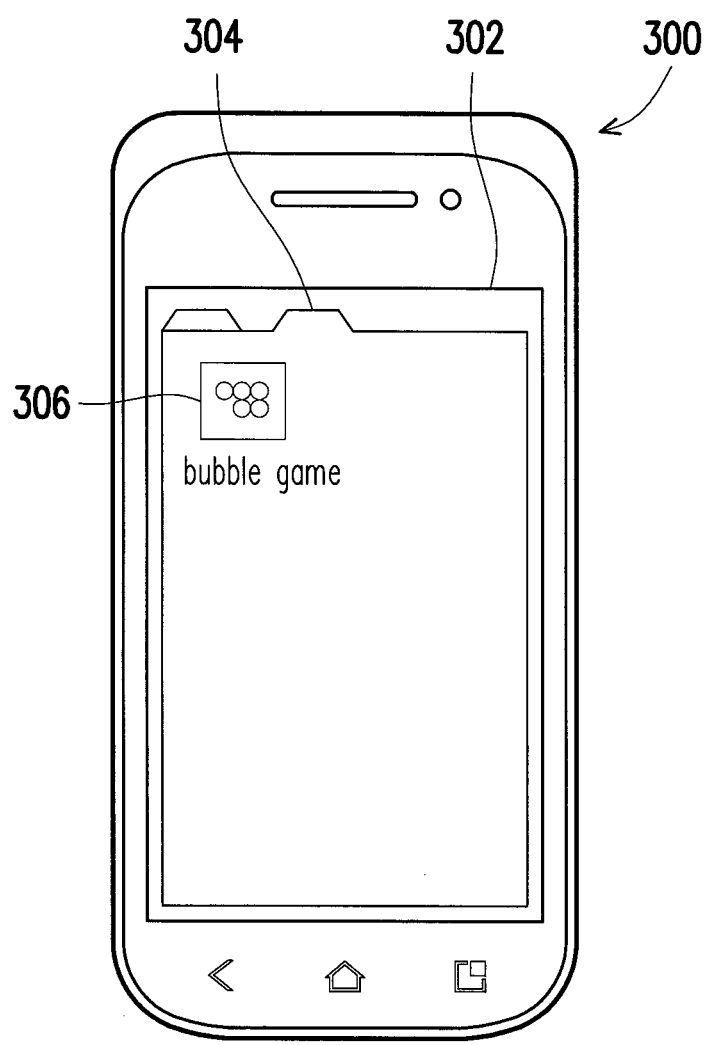
FIG. 3 is a schematic diagram showing a display device of a mobile device which displays an application list according to one embodiment of the disclosure.

In another embodiment, according to the flag, the processor 204 further sorts/classifies an object corresponding to the installed application into the application list corresponding to the flag (step S135). FIG. 3 is a schematic diagram showing a display device of a mobile device which displays an application list according to one embodiment of the disclosure. As shown in FIG. 3, a display device 302 of a mobile device 300 displays an application list 304. The application list 304 only shows the objects corresponding to the application which supports the display device with the resolution of 1024×768. For instance, when the supporting display format of the application only supports the display device with the resolution of 1024×768 (i.e. the application only supports the large dimension display device or the display with high resolution), the processor 204 records the flag of the application to be the first value P when the application is installed. Then, the processor 204, according to the flag, classifies the object 306 corresponding to the application into the application list 304 corresponding to the first value P.

Altogether, in the application installation method and mobile device of the present disclosure, before the application is installed, the application is analyzed to obtain it's hardware supporting abilities. When the hardware supporting abilities shows that the application does not support the display format of the display device of the mobile device, the user is notified to determine whether the installation of the application continues or should be terminated. Moreover, at the time the application is installed, the hardware supporting abilities of the application are recorded/labeled and the object corresponding to the installed application is classified into the application list corresponding to the hardware supporting abilities of the installed application. Hence, once the user selects the object to launch the corresponding application, the user clearly realizes whether the launched application supports the mobile device in use, which avoid the mobile device from launching the application which does not support the mobile device in use and the problems of failure operation or automatically shutdown of the mobile device due to launching the application can be overcome.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. An application installation method for a mobile device and an electronic device, wherein the mobile device has a first display format and the electronic device has a second display format, the method comprising:
   analyzing an application to obtain a supporting display format of the application when the application is installed;
   installing the application when the supporting display format meets a first display format;
   when the supporting display format does not support the first display format and support the second display format:
      issuing a notification to warn the application only supports the second display format;
      installing the application when a continuously installing signal is received; and
      terminating an installation of the application when a termination signal is received.

2. The application installation method of claim 1, wherein the mobile device and the electronic device are coupled to each other to form a hybrid portable device.

3. The application installation method of claim 1, wherein the mobile device comprises a cell phone, a smart phone or a personal digital assistant.

4. The application installation method of claim 3, wherein the step of installing the application when the continuously installing signal is received further comprises recording a utilization limitation of the application, wherein the utilization limitation includes that the application only supports the second display format.

5. The application installation method of claim 4, wherein the step of recording the utilization limitation of the application comprises:
   giving the application a flag, wherein the flag corresponds to the second supporting display format by the application.

6. The application installation method of claim 5, further comprising, according to the flag, classifying an object corresponding to the installed application into an application list corresponding to the flag.

7. A mobile device, comprising:
   a storage unit, storing an application;
   a processor, wherein the processor analyzes the application to obtain a supporting display format of the application and installs the application when the supporting display format of the application meets a first display format of the mobile device, and, when the supporting display format of the application only support a second display format of an electronic device, the processor issues a notification to warn the application only supports the second display format, installs the application when a continuously installing signal is received and terminates an installation of the application when a termination signal is received.

8. The mobile device of claim 7, wherein the mobile device and the electronic device are coupled to each other to form a hybrid portable device.

9. The mobile device of claim 7, wherein the mobile device comprises a cell phone, a smart phone or a personal digital assistant.

10. The mobile device of claim 7, wherein, when installing the application as the continuously installing signal is received, the processor further records a utilization limitation of the application, wherein the utilization limitation includes that the application only supports the second display format.

11. The mobile device of claim 10, wherein the processor recording the utilization limitation of the application further comprises:
   giving the application a flag, wherein the flag corresponds to the second supporting display format by the application.

12. The mobile device of claim 11, wherein the processor further, according to the flag, classifies an object corresponding to the installed application into an application list corresponding to the flag.

* * * * *